(12) United States Patent
Gualtieri

(10) Patent No.: US 6,327,221 B1
(45) Date of Patent: Dec. 4, 2001

(54) STEERED BEAM ULTRASONIC SENSOR FOR OBJECT LOCATION AND CLASSIFICATION

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/399,469

(22) Filed: Sep. 20, 1999

(51) Int. Cl.$^7$ ........................................................ H04B 1/02
(52) U.S. Cl. ........................ 367/138; 367/140; 181/142; 280/735
(58) Field of Search ............................ 181/142; 280/735; 367/140, 103, 104, 105, 137, 138

(56) References Cited

U.S. PATENT DOCUMENTS

| | | | |
|---|---|---|---|
| 4,180,792 | * 12/1979 | Lederman et al. | 367/7 |
| 5,901,978 | * 5/1999 | Breed et al. | 280/735 |
| 5,973,999 | * 10/1999 | Naff et al. | 181/142 |
| 6,007,095 | * 12/1999 | Stanley | 280/735 |
| 6,012,006 | * 1/2000 | Ohneda et al. | 701/45 |

* cited by examiner

Primary Examiner—Ian J. Lobo
(74) Attorney, Agent, or Firm—John G. Shudy, Jr.

(57) ABSTRACT

A vehicle occupant sensor which utilizes an acoustic system for determining object range, extent, and direction. The system is composed of an ultrasonic transmitter formed from an array of air chamber resonator elements driven in relative phase to each other to produce a steered acoustic beam. Electrical excitation circuitry converts waveform data stored in memory elements to electrical signals to drive the transmitter. One or more ultrasonic receivers receives the acoustic waves reflected from objects, and a processor determines the range, extent and direction of the objects based on the received acoustic waves.

17 Claims, 11 Drawing Sheets

STEERED BEAM ULTRASONIC SENSOR FOR OBJECT LOCATION AND CLASSIFICATION

FIELD OF THE INVENTION

The invention relates in general to an apparatus and method for detecting the presence of an object within a compartment of a vehicle. More specifically, the invention relates to an apparatus and method that uses an electronically steered ultrasonic beam to measure the range, angular extent and angular direction of an object located within a compartment.

BACKGROUND OF THE INVENTION

Air bag systems have become a standard vehicle safety feature to prevent injury to vehicle occupants. Unfortunately, in certain circumstances, early first generation air bags sometimes caused injury to the vehicle occupants due to the indiscriminate nature in which the air bags were inflated. The air bags would inflate at maximum force regardless as to whether the occupant was a child or an adult, whether the occupant was properly seated to face the air bag, or whether the occupant was too close to the point of air bag deployment. The application of maximum deployment force of the air bags to children or adults of small stature has resulted in injury even in relatively low speed collisions.

In view of the problems associated with the first generation air bag systems, a variety of "smart" air bag systems have been developed in an attempt to prevent unwanted injuries from occurring due to air bag deployment. These second generation air bag systems include sensors for detecting the presence of an occupant within a vehicle. U.S. Pat. No. 5,906,393 issued to Mazur et al., for example, discloses a system in which a weight sensor is used to determine the presence of an occupant in a vehicle seat. Other systems have been developed to specifically detect the presence of a child seat. U.S. Pat. No. 5,901,978 issued to Breed et al., for example, discloses a system for detecting the presence of a child seat that utilizes ultrasonic transducers.

While the above-described systems are improvements over the first generation systems, they are generally limited in the amount of information they can provide to control air bag deployment. It would be preferable to provide a system that could detect not only the presence of an occupant, but also distance of the occupant from the air bag and the occupant's angular direction and angular extent. For example, as children are generally narrower in width than adults, it would be beneficial to provide some measure of the angular extent of the occupant to provide a simple method of determining if the occupant is a child or an adult of small stature.

Ultrasonic or acoustic range finding in itself has been applied in many applications including, for example, lens focusing systems for in cameras in which an ultrasonic range finder computes the distance to an object and adjusts the lens focus accordingly. In such acoustic range finding applications, an appropriate transducer generates an acoustic signal as a short duration pulse. The pulse is reflected off of nearby objects and is received by the same, or another, transducer. As the speed of sound in air is a known quantity, the distance of the object from the transducers can be calculated from the transit time of the acoustic pulse.

Ultrasonic range finders typically use ultrasonic frequencies which are inaudible to the human ear. These high frequencies have inherently shorter wavelengths, which lead to greater positional accuracy than audible frequencies. Some systems known in the art use several simultaneous signals with differing frequencies. These simultaneous signals are generated to provide at least one readable signal in the presence of acoustic interference.

Ultrasonic sensors are typically made from a single transmitter/receiver transducer. A brief ultrasonic pulse is transmitted, and this is reflected from a nearby object. The transducer, now used as a receiver, detects the reflected pulse. This type of sensor will give object distance information, but provides no angular position or extent information.

Phased array radar systems utilize a stationary array of transducers to generate object distance, angular extent, and angular position information. An array of many transducers driven at different amplitudes and phases can produce a lobe pattern of one narrow beam which is steerable over a wide angle. This technique is called aperture synthesis and it is used in phased array radar systems.

The beam is formed by the interference of the radar waves, a consequence of the principal of linear superposition. In linear superposition, the radiation of one source combines with that of another source to either increase or decrease the radiation amplitude at a point, causing constructive interference or destructive interference respectively. A well known example of this principal is the Young Experiment of 1802 in which light is passed through a pinhole to create a point light source, then it is through two other pin holes, finally the light is projected on a screen. A regular pattern of light and dark bands appears on the screen, which is caused by the interference of the two point sources. A more detailed analysis of the Young Experiment appears in D. Halliday and R. Resnick, "Physics for Students of Science and Engineering," Part II, Second Edition, John Wiley & Sons, Inc., New York, 1962, pp. 976–982. Further information may be found in Grant R. Fowles, "Introduction to Modern Optics," Holt, Rinehart and Winston, Inc., New York, 1968, pp. 62–66. The linear superposition effect is applicable to light waves, radar waves, and acoustic waves.

A similar steered beam system which uses a stationary array of transducers would be desirable for vehicle occupant detection. However, due to the inherent characteristics of radar wavelength and frequency, radar is not accurate enough for close range use in measuring the relatively small variations in distance between a passenger and an automotive air bag. Therefore, a device which uses aperture synthesis technology and facilitates accurate short range distance measurement is needed.

If an array of acoustic transducers were utilized, an interference pattern could be formed if the transducer spacing is about the same as the wavelength of the acoustic signal. If the speed of sound in air is about 344 m/sec, an ultrasonic transducer operating at a frequency of 68.8 kHz will have a wavelength of 5 mm, while higher frequencies will have proportionately smaller wavelengths. If two transducers are used and spaced apart by a wavelength, the transmitted beam pattern will be similar to the beam pattern shown in FIG. 1 in which a central main lobe is produced with corresponding side lobes. If a phase shift from 0–180 degrees is introduced between the transducers, the main lobe is steered to one side and the intensity of the side lobes is changed until a symmetric lobe pattern is achieved at a 180 degree phase shift as shown in FIG. 2. Thus, a simple two transducer system could offer limited scanning capability and the ability to distinguish between objects at the front and sides of the transducers. A larger array of transducers, for example a 4×4 array, driven at different amplitudes and phases could produce a lobe pattern including one narrow beam steerable over a wide angle as illustrated in FIG. 3.

While efficient ultrasonic transducers are available commercially, these transducers are typically formed as a resonant diaphragm with diameter of about one wavelength since this structure produces an efficient conversion of electrical energy to sound energy. The speed of sound in a typical diaphragm material is much faster than the speed of sound in air. As a consequence, the wavelength in the diaphragm is larger than that in air at the same frequency, and the diameter of these diaphragm transducers is larger than one wavelength in air. Thus, the closest possible spacing of this type of transducer exceeds one wavelength in air.

The inherent diameter of the diaphragm transducers presents a problem when constructing an array of acoustic sources to generate a steered radiant beam. In the simple case of two sources separated by a spacing d and driven in phase by the same excitation voltage, the angular separation in radians between maxima or minima of the interference pattern is about $\lambda/d$. For a transducer separation of twice the wavelength, the resultant interference pattern has a beam perpendicular to the plane of the transducers defined by minima at 14.3 degrees at either side of the center. A pair of secondary side lobe beams are formed at 28.6 degrees on either side of the central beam. If it is desired to probe only the region directly in front of and perpendicular to the plane of the transducer, there will be undesirable interfering signals from these secondary side lobe beams and additional side lobe beams at larger angles. FIG. 4. illustrates angle spacing to the first minimum as a function of separation of two acoustic sources.

As described above, a desirable method of producing a steered acoustic beams is to use an array of many transducers driven at different signal phases. The beams from the individual transducers will supplement each other to give a large signal amplitude in a given direction. Destructive interference between the beams will lead to a small signal amplitude away from the chosen direction. In the two transducer case, however, the presence of side lobes will lead to ambiguous signals. In range finding applications, accurate positional information will be lost since acoustic reflections would be generated by the side lobes as well as the main beam. A solution to the side lobe beam problem would be to place the array transducers very close to each other, preferably less than one wavelength. Unfortunately this is impossible for the aforementioned resonant diaphragm type of transducer, due to the inherent diameter of the transducer which is larger than one wavelength.

In view of the above, it is an object of the invention to provide an apparatus and method that utilizes a steered acoustic beam for object location and classification, and further to incorporate such apparatus and method into a detection system for detecting the presence of an object within a compartment of a vehicle, as well as the objects's distance, angular direction and angular extent.

SUMMARY OF THE INVENTION

The present invention provides a vehicle occupant sensor which utilizes an electronically steered acoustic beam to scan its surroundings in a sweeping or spot pointing pattern to determine the angular position, angular extent, and range of objects. The steered beam is provided by a stationary array of acoustic sources driven in relative phase to each other. The apparatus employs aperture synthesis techniques which are common in phased array radar systems, but have not been applied to acoustic systems. Undesirable side lobe beam interference is reduced by the utilization of air chamber resonators, which permit the system to perform as if the transducers were spaced less than one wavelength apart.

More specifically, an acoustic wave transmitter is provided that includes a resonator body, a plurality of air chamber resonators arranged in an array in the resonator body to form an array of exit holes, and a plurality of transducers corresponding to the plurality of air chamber resonators. The transducers are acoustically coupled to the air chamber resonators and drive the air chamber resonators to generate an acoustic signal, and the spacing provided between adjacent exit holes is not greater than one wavelength of the acoustic signal.

The air chamber resonators preferably extend through the resonator body to form a second array of exit holes. A tuning mechanism, in the form of moveable plugs, is provided in the exit holes of the second array. The tuning mechanism permits the tuning of the resonance and phase of the air chamber.

In order to operate the transducers, a control circuit is provided that converts waveform data stored in a memory to electrical drive signals that are supplied to the transducers, wherein the transducers drive the chamber resonators in relative phase to each other to produce a steered acoustic beam as the acoustic signal. The control circuit preferably includes an addressable memory containing digital waveform data for driving each air chamber resonator, a register for selecting regions of the addressable memory in which the waveform data reside, and a counter for cycling through the selected regions to present the waveform data to the transducers at a desired rate.

The transducers are preferably vibrating diaphragm type transducers, and are acoustically coupled to the air chamber resonators via transducer excitation holes formed in the resonator body. The transducer excitation holes can be formed on a common side of the resonator body or on opposite sides of the resonator body.

An input transducer or receiver is used to receive the acoustic signal generated by the air chamber resonators after it has reflected off an object. A processor coupled to the receiver determines at least one of range, angular extent and angular direction of objects that reflect the acoustic signal, based on the signal received by the receiver.

The invention is preferably incorporated as a detection apparatus for detecting an object within a compartment of a vehicle, such that the acoustic wave transmitter is located to scan a steered acoustic signal within the compartment, and the receiver receives a reflected acoustic signal generated by the reflection of the steered acoustic signal off objects located within the compartment. A controller determines at least one of range, angular extent and angular direction of the object, and preferably controls the operation of an air bag in response thereto.

Other advantages and features of the invention will become apparent from the following detailed description of the preferred embodiments of the invention and the accompanying drawings.

BRIEF DESCRIPTION OF THE DRAWINGS

The invention will now be described with reference to certain preferred embodiments thereof with reference to the accompanying drawings, wherein.

DETAILED DESCRIPTION OF THE PREFERRED EMBODIMENTS

The present invention uses a stationary array of acoustic sources to generate a steered acoustic beam. The steered acoustic beam performs an angular or spot pointing sweep of its surroundings to determine the angular position, angular extent, and distance of vehicle passengers. The steered beam is provided by an array of acoustic transducers driven in relative phase to each other. The beam is formed by the interference of the sound waves, a consequence of the principal of linear superposition. With proper choice of phases, the beams from the individual transducers supplement each other to give a large signal amplitude in a given direction. A multiplicity of acoustic sources has the simultaneous advantage of reducing the beam width and expanding the angular sweep range of the beam. Aperture synthesis is achieved by independently controlling the phase and amplitude of each acoustic source.

Due to the inherent diameter of diaphragm transducers discussed above, they cannot be spaced more closely than about one wavelength apart. Unfortunately transducers whose spacing is greater than one wavelength will generate undesirable side lobe beams. The present invention overcomes this spacing problem through use of an array of resonant air chambers driven by resonant diaphragm transducers. These chambers permit the transducers to perform as if they are spaced more closely than is physically possible. Therefore, destructive interference between the beams to minimize the magnitude of the undesirable side lobe beams.

Figure 1:
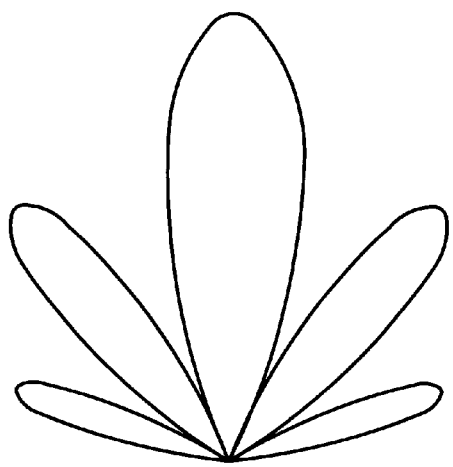
FIG. 1 is a beam pattern for two transducers a wavelength apart when driven in phase.
Figure 2:
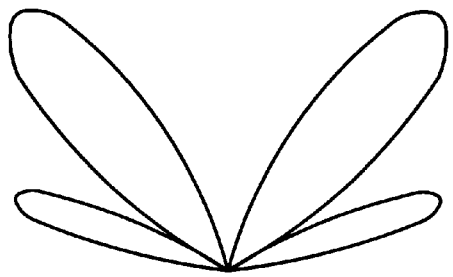
FIG. 2 is a beam pattern for two transducers a wavelength apart when driven out of phase.
Figure 3:
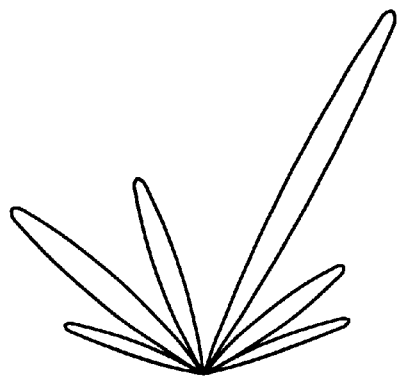
FIG. 3 is a beam pattern for an 4×4 array of transducers.
Figure 4:
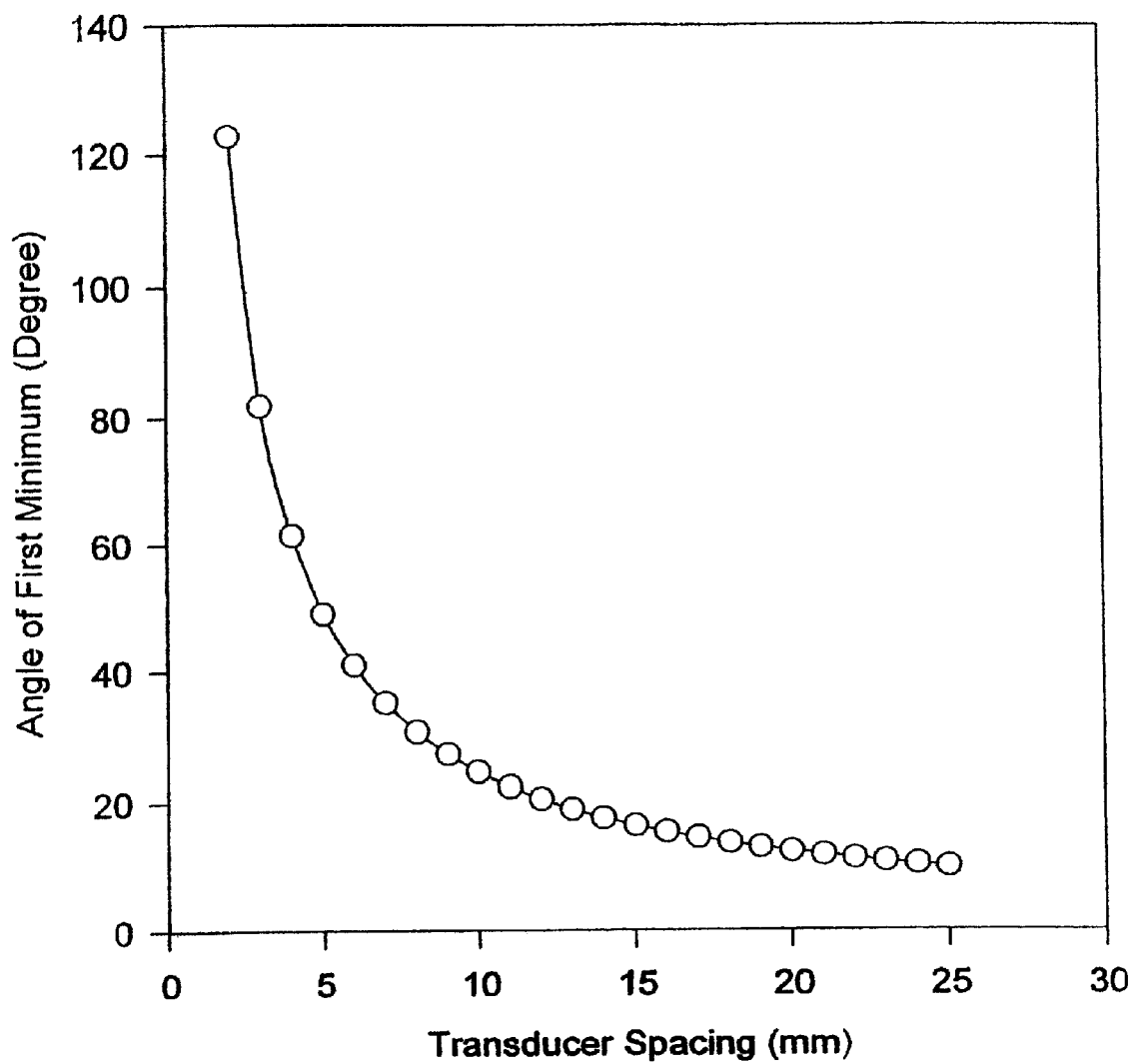
FIG. 4 is a graph of the calculated angle of appearance of the first amplitude minimum as a function of source transducer spacing
Figure 5:
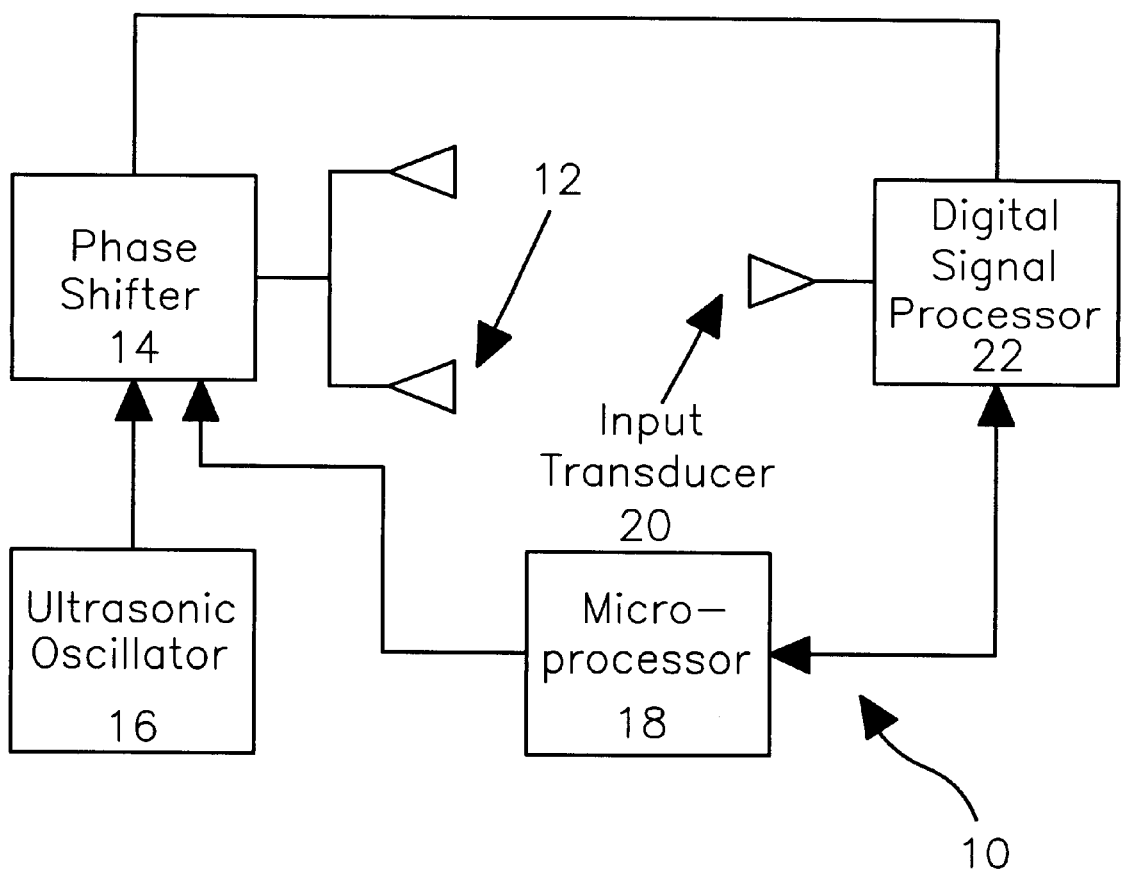
FIG. 5 is a schematic block diagram of an apparatus in accordance with the invention.

Referring now to FIG. 5, a basic schematic block diagram of an acoustic phased array vehicle occupant sensor system 10 in accordance with the invention includes an array of acoustic output transducers 12 coupled to a phase shifter 14 that is driven by a ultrasonic oscillator 16 under control of a microprocessor 18. An input transducer 20 is provided to receive acoustic signals reflected from objects to be detected. The input transducer 20 is coupled to a digital signal processor 22 which extracts the reflected signals from background noise and digitizes the signals for further processing by the microprocessor 18.

Figure 6:
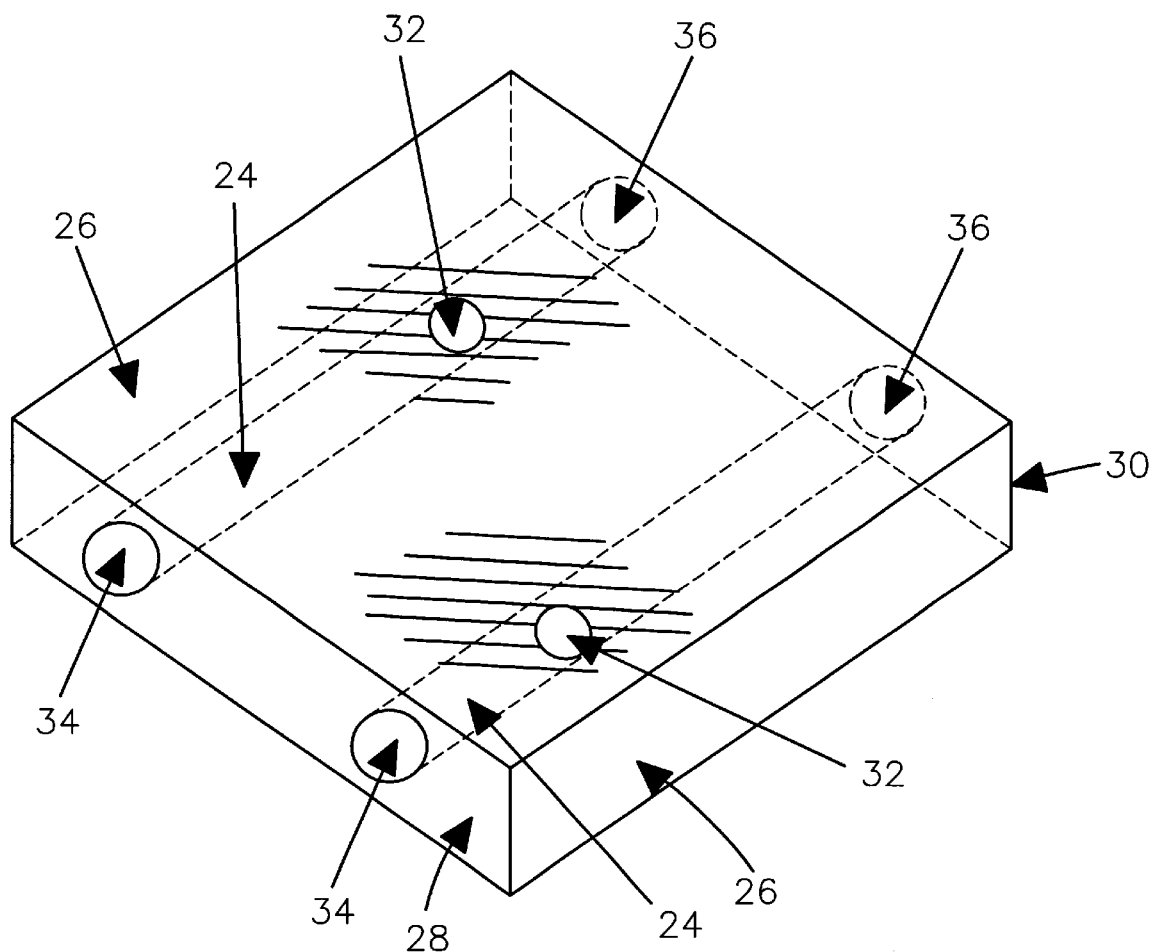
FIG. 6 is a perspective view of a resonator body with transducer excitation holes provided on a common side.

The structure of the acoustic output transducers 12 will now be described in greater detail. As shown in FIG. 6, a plurality of air chamber resonators 24 are formed in a solid body 26 such that the air chamber resonators 24 extend from a first end 28 of the solid body 26 to a second end 30. The air chamber resonators 24 are tapped by forming transducer excitation holes 32 perpendicular to the air chamber resonators 24 from either side of the solid body 26 to allow transducer excitation of the air chamber resonators 24. Although circular cross-sections are shown, the air chamber resonators 24 can be formed of any desired shape. The air chamber resonators 24 are spaced so that a first array of exit holes 34 are provided on the first end 28 of the solid body 26 and a second array of exit holes 36 are provided on the second end 30 of the solid body 26. The exit holes 24, 26 are spaced at a particular fraction of the wavelength of acoustic waves to be generated.

Figure 7:
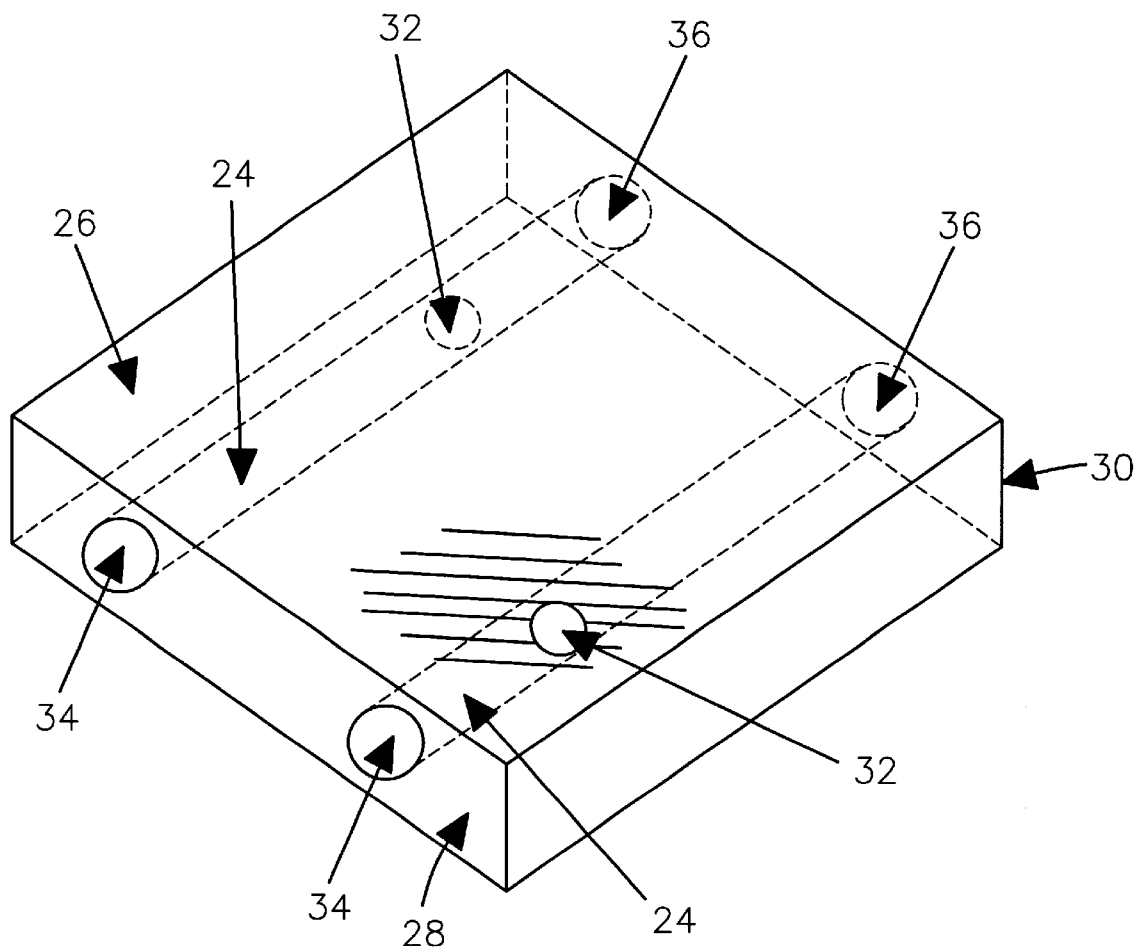
FIG. 7 is a perspective view of a resonator body with transducer excitation holes provided on opposite sides.

FIG. 7 illustrates a second embodiment in which the transducer excitation holes 32 are present on opposite surfaces of the solid body 26, which allows for a closer spacing of the air chamber resonators 24 in some circumstances. As in FIG. 6, the air chamber resonators 24 form a first array of exit holes 34 at the first end 28 of the solid body 26, and a second array of exit holes 36 at the second end 30.

Figure 8:
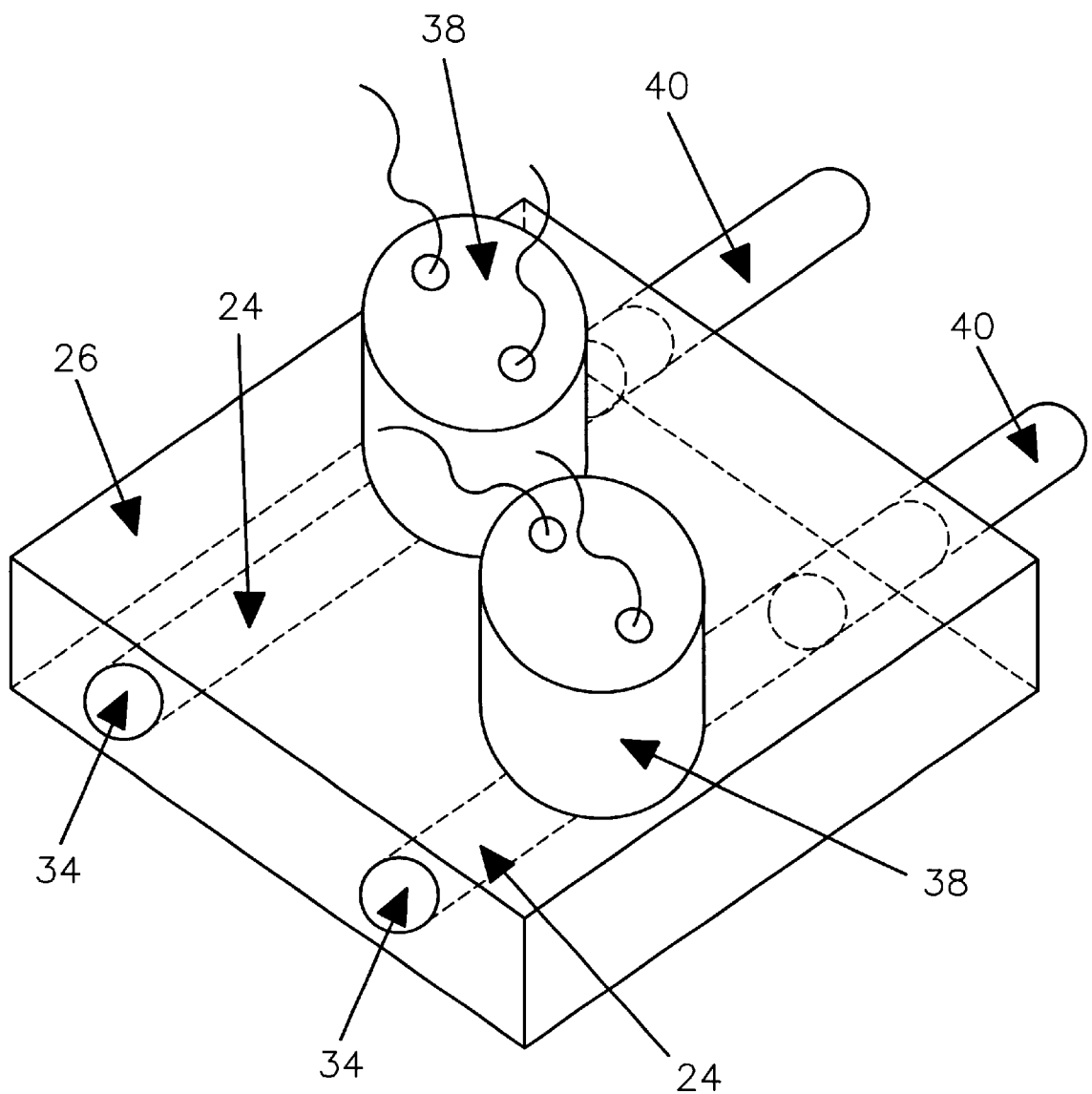
FIG. 8 is a perspective view of transducers mounted on the same side of the resonator solid body.

FIG. 8 illustrates the functional elements of the operational linear acoustic resonator array. Transducer elements 38 are mounted above the transducer excitation holes 32 to cause acoustical resonance in the air chamber resonators 24. The second array of exit holes 36 are closed off at the second side 30 by moveable plugs 40 which allow for fine tuning of the air chamber resonance and a phase adjustment. In a preferred embodiment, a portion of the moveable plugs 40 and air chamber resonators 24 are threaded to allow for an easy phase adjustment.

Figure 9:
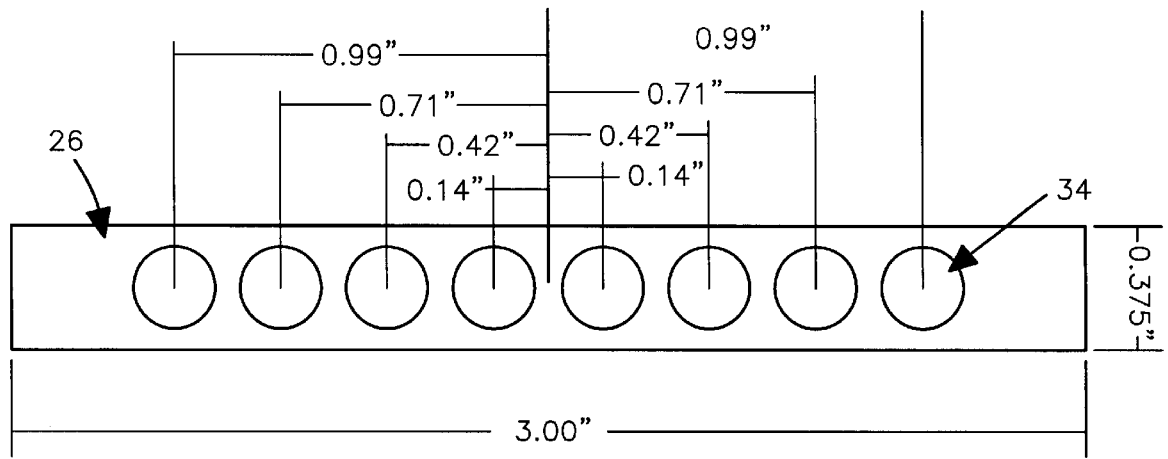
FIG. 9 shows a plan view an embodiment of the linear acoustic resonator array with exit holes spaced for 41 kHz operation.

FIG. 9 illustrates the spacing of the exit holes 34 in an embodiment of a linear acoustic resonator array for a 41 kHz operating frequency. For such an array to form a steered beam, it is necessary for each element of the array to be driven at a particular signal phase which is fixed by the desired beam direction. In the present invention, the drive circuitry has been simplified by noting that resonator type transducers do not require a sine wave excitation.

Instead of a sine wave excitation, these transducers 38 are excited at their resonant frequency by a square wave voltage signal. When a square wave voltage signal is decomposed into a summation of odd harmonic sine wave signals by the Fourier transform, it is seen that there is considerable signal energy at the first harmonic fundamental frequency and decreasing signal energies at the subsequent harmonics. A square wave electrical signal at the transducer resonant frequency will excite the transducer with nearly the same efficiency as a sine wave signal.

Figure 10:
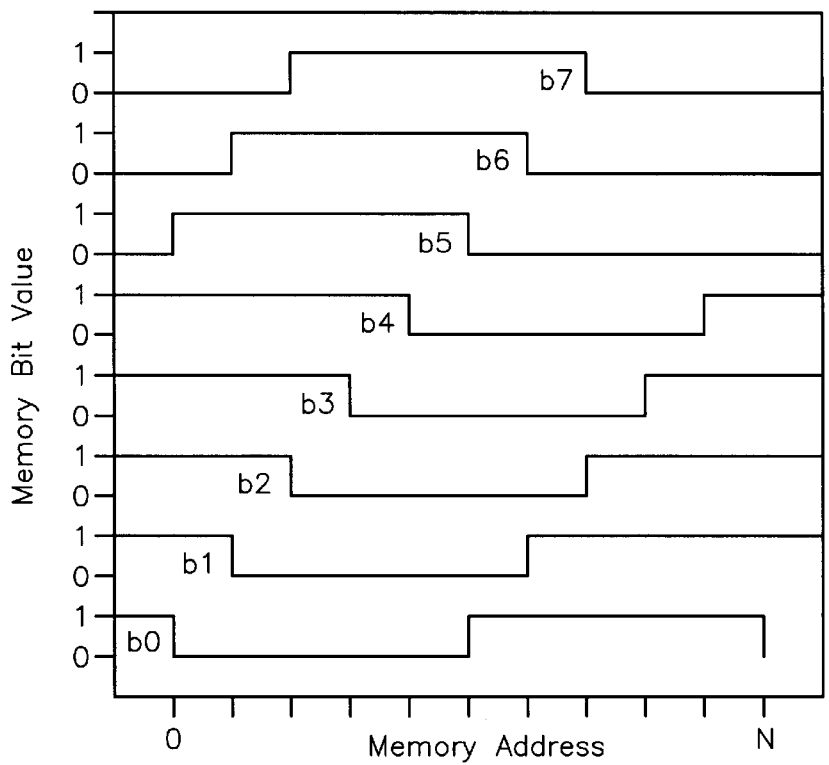
FIG. 10 is a graph of square wave electrical signals in a memory element address space for driving phased array transducers at selected relative phases.

In the present invention, these square wave signals are preferably stored in a digital memory element as graphed in FIG. 10. The square waveform data are stored in the memory element as a sequence of digital bits. When the memory address is repeatedly cycled from its starting address (0) and its maximum address (N), the bit outputs become time varying square wave signals of period (N/f), where f is the clocking frequency of the address. As shown in FIG. 10, these bit images of the waveforms can be set to maintain a relative phase shift with respect to each other. Although only eight bit waveforms are shown, the number of possible waveforms is not limited, and such a scheme can drive any desired number of transducers.

Figure 11:
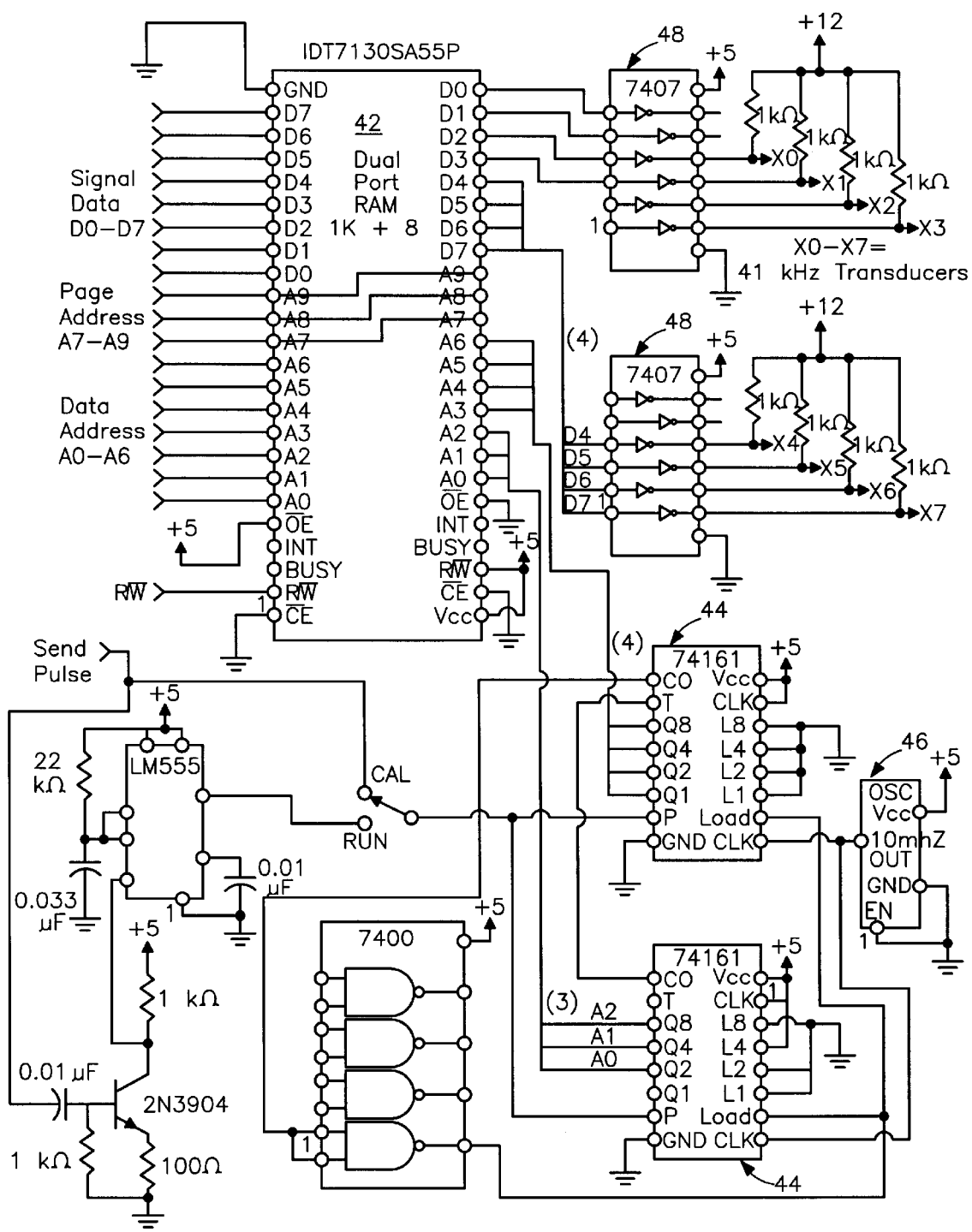
FIG. 11 is an electrical schematic of an embodiment of the electrical signal generation circuit for driving transducers.

The circuitry for generating square wave signals of different relative phases for each transducer is also simplified when only a fixed number of beam directions is required. In this case, the waveforms specifying a particular beam direction can be stored as "pages" in the memory element. A practical embodiment of a circuit for accomplishing this is shown in FIG. 11, in which the digital waveform data for driving eight transducers are stored in eight pages of 128 memory locations each. The memory space of each page, 128 address locations, is sufficient to specify a phase to a precision of about three degrees. A dual-port read/write memory 42 circuit is utilized to store the waveform data, which allows the waveform data to be written into the memory 42 and updated if necessary by a processor (not shown) coupled to the memory 42. Counter circuits 44 are provided so that a 10 MHZ local oscillator 46 cycles through 122 memory locations at a rate, 40.98 kHz, sufficiently close to the resonant frequency, 41 kHz, of the selected transducer elements. The waveforms are encoded in these 122 memory locations, and drive circuits 48 are used to convert the digital waveform data pulses into the high voltage needed to drive the particular transducers.

Figure 12:
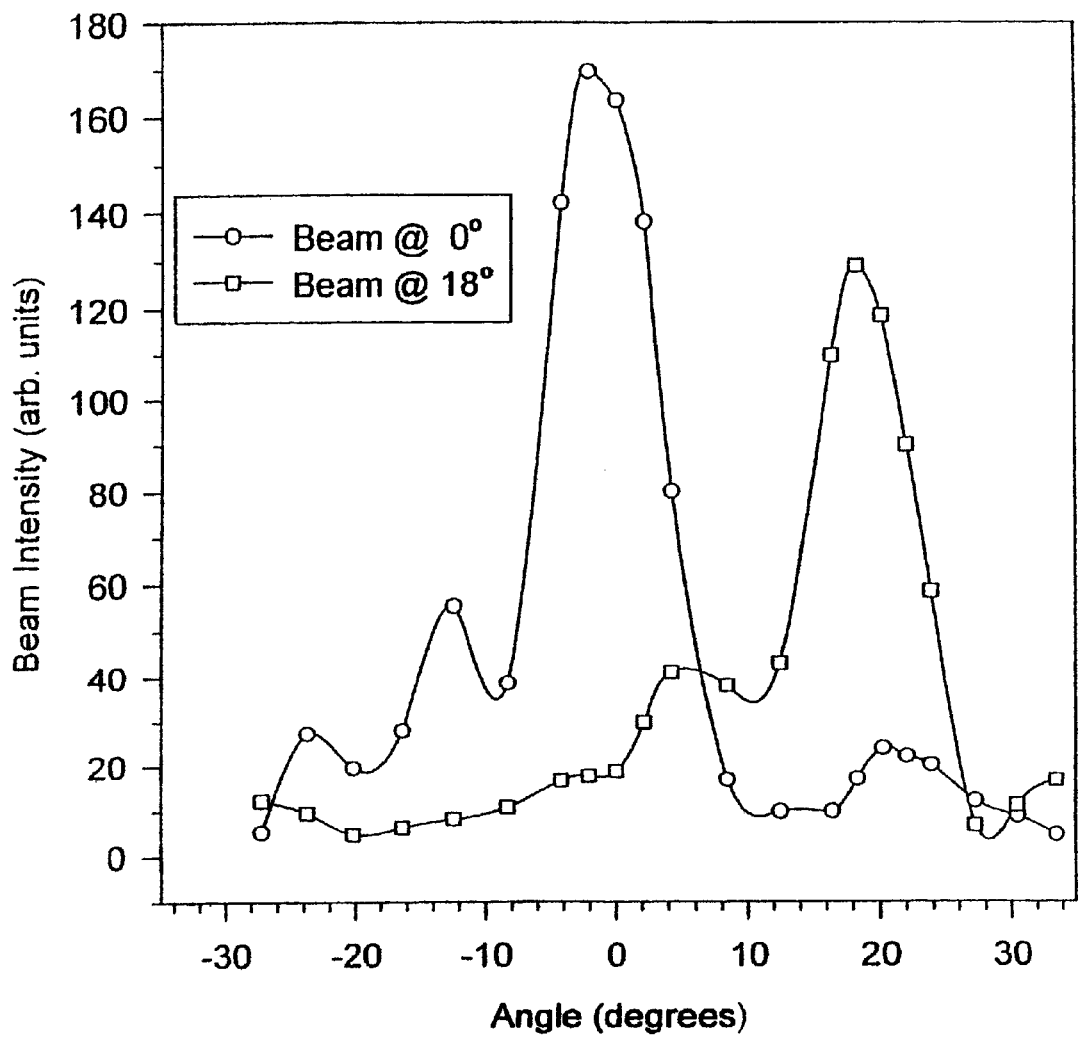
FIG. 12 is a graph illustrating acoustic beam steering ability in a 41 kHz linear resonator acoustic source array of eight elements.

FIG. 12 graphically illustrates the beam pointing ability for the 41 kHz resonator array illustrated in FIG. 10. In this example, the relative phases of the eight array sources were adjusted to give maximum signal strength directly in front of the array, at 0 degrees; and then at a direction 18 degrees away from the plane of the resonator columns. The ability of the array to direct the acoustic signals in these directions is demonstrated in this figure.

Figure 13:
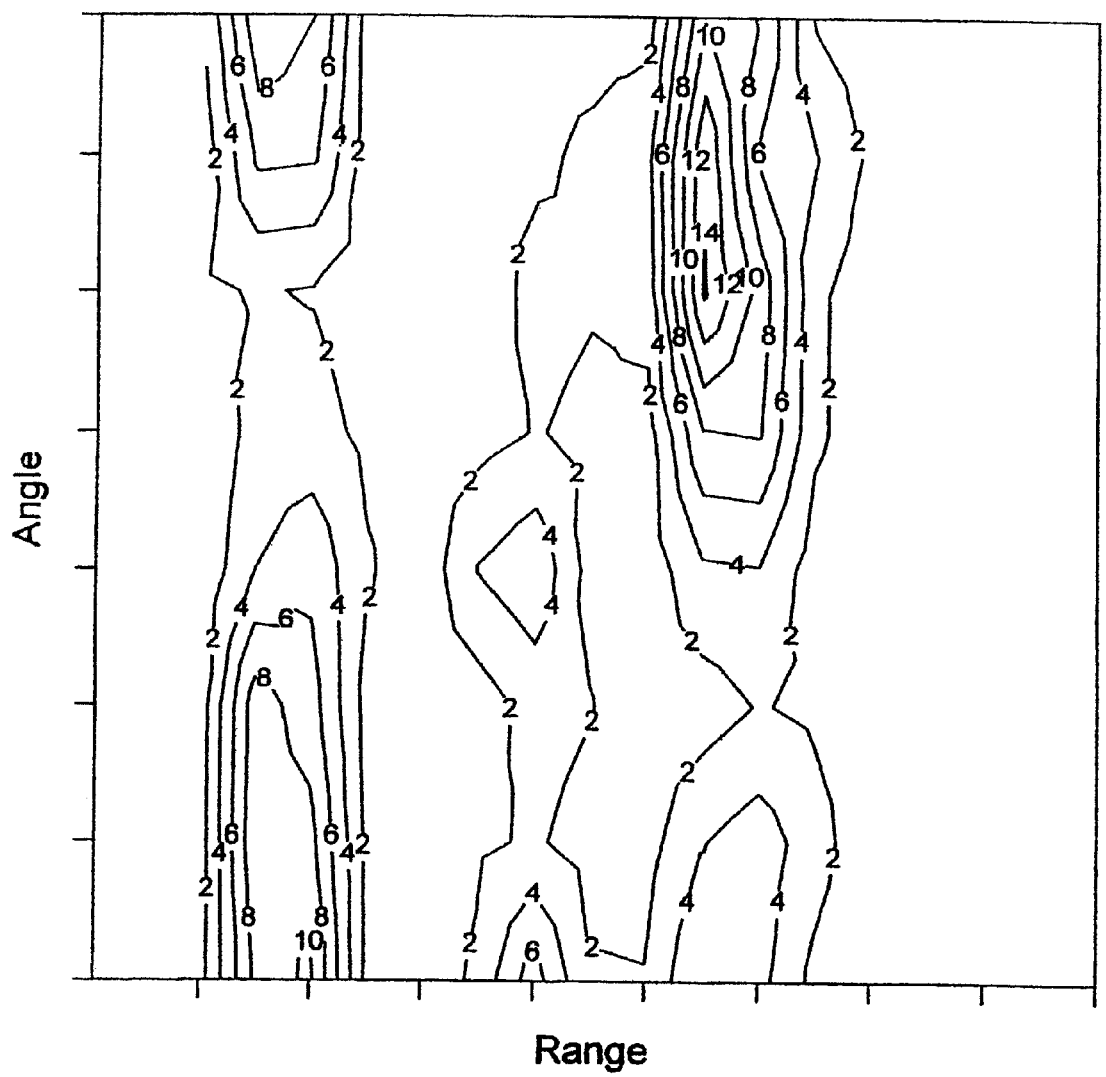
FIG. 13 is a graph of reflected acoustic energy from room objects as a function of range and beam angle for a 41 kHz linear resonator acoustic source array of eight elements.

FIG. 13 is an example of the performance of a direction and ranging system built from a 41 kHz linear acoustic array illustrated in FIG. 10, the electronic driver circuitry illustrated in FIG. 11, and an ultrasonic receiver. The receiver was in proximity to the acoustic array, and it received ultrasonic energy reflected from nearby room objects. The range to an object was determined by the transit time of a 1 msec acoustic wave pulse from the linear array. The beam from the linear array was steered into eight vertical directions separated by about five degrees. The figure represents an intensity map for a chair at far range.

The invention provides acoustic data indicative of range, angular direction and angular extent of an object within a scanned field. Based on this data, the system processor 18 can determine range based on the time required to receive the acoustic signal, angular direction based on the angle of the steered beam when the acoustic signal is detected, and angular extent based on the arc of the steered beam during which the acoustic signal is detected. This information can be utilized in an occupant detection system to control deployment of an air bag and prevent unwanted injuries. For example, the rate of inflation of the air bag may be made dependent on the range of the occupant. Further, the angular extent of the occupant can be utilized to control the force of deployment, so that occupants of smaller stature or children are not subjected to the maximum deployment force of the air bag.

Figure 14:
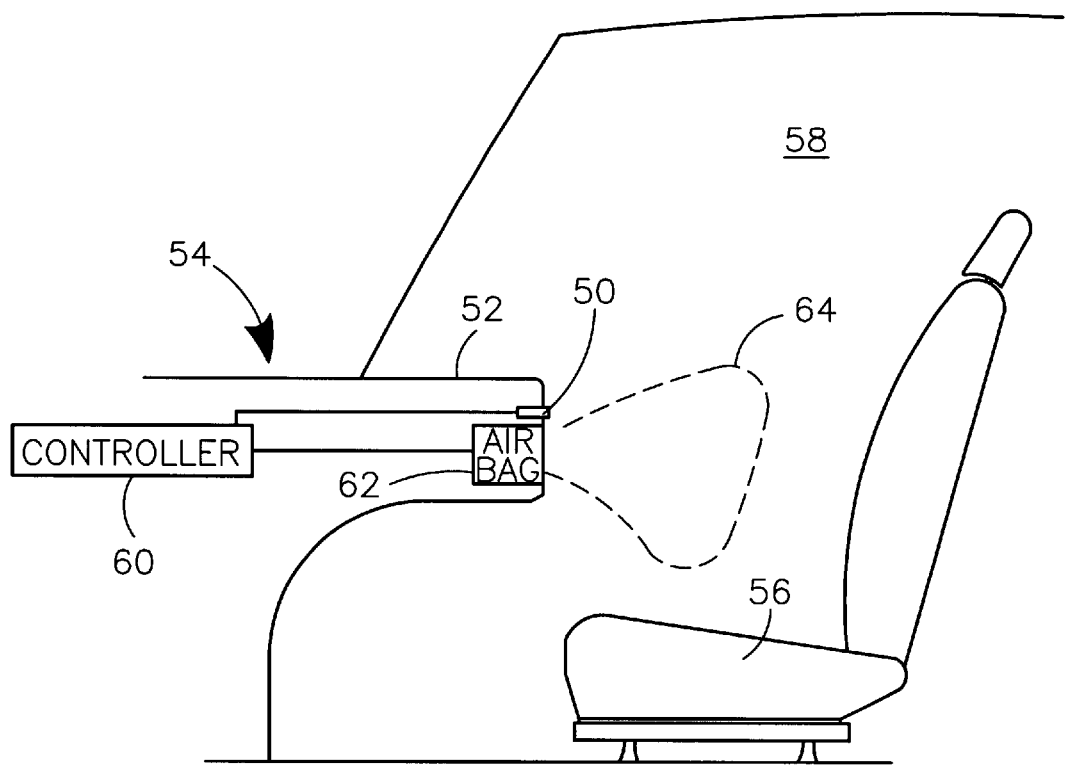
FIG. 14 is a schematic diagram illustrating an apparatus for detecting an object within a compartment of a vehicle.

FIG. 14 illustrates an occupant detection system in accordance with the invention that include a sensor module 50 mounted to a dashboard 52 of a vehicle 54. The sensor module 50 includes the array of acoustic output transducers 12 and input transducer 20 discussed above, and is positioned so that a steered acoustic beam emitted from the array of acoustic output transducers 12 is directed to a passenger seat 56 located within a passenger compartment 58 of the vehicle 54. The sensor module 50 is coupled to a controller 60 that contains the various processing circuitry previously described that is required to drive the array of acoustic output transducers 12 and to analyze the signals received from the input transducer 20. The controller 60 controls the activation of the air bag 62 in response to the signals received from the input transducer 20 of the sensor module 50, such that the air bag 62 is deployed within a prescribed envelope 64 within the compartment 58.

The invention has been described with reference to certain preferred embodiments thereof. It will be understood, however, that modification and variations are possible within the scope of the appended claims. For example, the sensor module may be located at positions within the passenger compartment other than the dashboard, and may also be employed to detect objects in compartments other than the passenger compartment, as in the case of a child trapped in the trunk of a vehicle. Also, the number of transducers utilized in the array may vary along with their operating frequency. Still further, multiple modules may be employed so that steered beams are generated in more than one plane.

What is claimed is:

1. An acoustic wave transmitter comprising:
   a resonator body;
   a plurality of air chamber resonators arranged in an array in the resonator body to form an array of exit holes;
   a plurality of transducers corresponding to the plurality of air chamber resonators, wherein the transducers are acoustically coupled to the air chamber resonators and drive the air chamber resonator to generate an acoustic signal;
   wherein a spacing provided between adjacent exit holes is not greater than one wavelength of the acoustic signal; and
   tuning means for tuning a resonance and phase of each of said air chamber resonators.

2. An acoustic wave transmitter as claimed in claim 1, wherein the air chamber resonators extend through the resonator body to form a second array of exit holes, wherein the tuning means comprises moveable plugs located in the exit holes of the second array.

3. An acoustic wave transmitter as claimed in claim 1, wherein the transducers are resonant diaphragm type transducers.

4. An acoustic wave transmitter as claimed in claim 1, wherein the transducers are acoustically coupled to the air chamber resonators via transducer excitation holes formed in the resonator body.

5. An acoustic wave transmitter as claimed in claim 4, wherein the transducer excitation holes are formed on opposite sides of the resonator body.

6. An acoustic wave transmitter as claimed in claim 4, wherein the transducer excitation holes are formed on a common side of the resonator body.

7. An acoustic wave transmitter comprising:
   a resonator body;
   a plurality of air chamber resonators arranged in an array in the resonator body to form an array of exit holes;
   a plurality of transducers corresponding to the plurality of air chamber resonators, wherein the transducers are acoustically coupled to the air chamber resonators and drive the air chamber resonator to generate an acoustic signal;

a control circuit that converts waveform data stored in a memory element to drive electrical drive signals that are supplied to the transducers; and wherein a spacing provided between adjacent exit holes is not greater than one wavelength of the acoustic signal.

8. An acoustic wave transmitter as claimed in claim 7, further comprising a receiver that receives the acoustic signal generated by the air chamber resonators.

9. An acoustic wave transmitter as claimed in claim 8, further comprising a processor coupled to the receiver, wherein the processor determines at least one of range, angular extent and angular direction of objects that reflect the acoustic signal.

10. An acoustic wave transmitter as claimed in claim 7, wherein the control circuit includes:

an addressable memory containing digital waveform data for driving each air chamber resonator;

a register for selecting regions of the addressable memory in which the waveform data reside; and a counter for cycling through the selected regions to present the waveform data to the transducers at a desired rate.

11. An acoustic wave transmitter comprising:

a resonator body;

a plurality of air chamber resonators arranged in an array in the resonator body to form an array of exit holes;

a plurality of transducers corresponding to the plurality of air chamber resonators, wherein the transducers are acoustically coupled to the air chamber resonators and drive the air chamber resonator to generate an acoustic signal;

wherein a spacing provided between adjacent exit holes is not greater than one wavelength of the acoustic signal; and wherein the transducers drive the chamber resonators in relative phase to each other to produce a steered acoustic beam as the acoustic signal.

12. A detection apparatus for detecting an object within a compartment of a vehicle:

an acoustic wave transmitter that generates a steered acoustic signal;

a receiver that receives a reflected acoustic signal generated by the reflection of the steered acoustic signal off objects located within the vehicle compartment;

a controller coupled to the receiver;

wherein the controller, using the reflected steered acoustic signal, determines at least one of range, angular extent and angular direction of the object;

wherein the acoustic wave transmitter includes:

a resonator body;

a plurality of air chamber resonators arranged in an array in the resonator body to form an array of exit holes; and a plurality of transducers corresponding to the plurality of air chamber resonators, wherein the transducers are acoustically coupled to the air chamber resonators and drive the air chamber resonators to generate the steered acoustic signal.

13. A detection apparatus as claimed in claim 12, wherein a spacing provided between adjacent exit holes is not greater than one wavelength of the acoustic signal.

14. A detection apparatus as claimed in claim 12, further comprising: tuning means for tuning a resonance and phase of each of said air chamber resonators.

15. A detection apparatus as claimed in claim 14, wherein the air chamber resonators extend through the resonator body to form a second array of exit holes, and wherein the tuning means comprises moveable plugs located in the exit holes of the second array.

16. A detection apparatus as claimed in claim 12, wherein the transducers are resonant diaphragm type transducers.

17. A detection apparatus as claimed in claim 12, wherein the controller includes:

an addressable memory containing digital waveform data for driving each air chamber resonator;

a register for selecting regions of the addressable memory in which the waveform data reside; and a counter for cycling through the selected regions to present the waveform data to the transducers at a desired rate.

* * * * *